(12) United States Patent
Liu (10) Patent No.: US 10,247,341 B2
(45) Date of Patent: Apr. 2, 2019

(54) QUICK CONNECT FITTING

(71) Applicant: Hsiu-Hsiung Liu, New Taipei (TW)

(72) Inventor: Hsiu-Hsiung Liu, New Taipei (TW)

( * ) Notice: Subject to any disclaimer, the term of this patent is extended or adjusted under 35 U.S.C. 154(b) by 0 days.

(21) Appl. No.: 15/670,338

(22) Filed: Aug. 7, 2017

(65) Prior Publication Data

US 2019/0040986 A1  Feb. 7, 2019

(51) Int. Cl.
| | |
|---|---|
| *F16L 37/38* | (2006.01) |
| *F16L 37/23* | (2006.01) |
| *F16L 21/02* | (2006.01) |
| *F16L 37/42* | (2006.01) |

(52) U.S. Cl.
CPC ............ *F16L 37/23* (2013.01); *F16L 37/38* (2013.01); *F16L 21/02* (2013.01); *F16L 37/42* (2013.01)

(58) Field of Classification Search
CPC .. F16L 37/23; F16L 21/02; F16L 37/08; F16L 37/38; F16L 37/40; F16L 37/413; F16L 37/42; F16L 37/44; Y10T 137/87925; Y10T 137/87933; Y10T 137/87941; Y10T 137/87949; Y10T 137/87957; Y10T 137/87965
USPC ............... 251/149.1, 149.6–149.9; 137/614–614.06, 798; 285/306, 316
See application file for complete search history.

(56) References Cited

U.S. PATENT DOCUMENTS

| | | | | |
|---|---|---|---|---|
| 2,297,548 A | * | 9/1942 | Fox ........................ | F16L 37/22 251/149.6 |
| 2,377,812 A | * | 6/1945 | Scheiwer ................ | F16L 37/23 251/149.6 |
| 2,473,973 A | * | 6/1949 | Scheiwer ................ | F16L 37/23 285/277 |
| 3,378,225 A | * | 4/1968 | Snyder, Jr. .............. | F16L 37/23 251/149.6 |
| 3,567,175 A | * | 3/1971 | Sciuto, Jr. ............... | F16L 37/23 251/149.6 |
| 4,070,003 A | * | 1/1978 | Shames .................... | F16L 37/22 251/149.6 |
| 4,498,658 A | * | 2/1985 | Mikiya ................... | F16L 37/23 251/149.6 |
| 5,211,197 A | * | 5/1993 | Marrison ................ | F16L 37/23 137/614 |
| 5,323,812 A | * | 6/1994 | Wayne .................... | F16L 37/23 137/614.03 |

(Continued)

*Primary Examiner* — Craig J Price
*Assistant Examiner* — Andrew J Rost
(74) *Attorney, Agent, or Firm* — Ming Chow; Sinorica, LLC (57) ABSTRACT

A quick connect fitting has a coupling assembly, a socket assembled on the coupling assembly, multiple blocking balls, multiple locking balls, and an operating assembly. The multiple blocking balls and the multiple locking balls are mounted in the socket. The operating assembly is mounted around the socket and has a first operating sleeve, a first compression spring, a second operating sleeve, and a second compression spring. The first operating sleeve is blocked by the multiple locking balls. The first compression spring abuts against both the first operating sleeve and the coupling assembly. The second operating sleeve is blocked by the multiple blocking balls. The second compression spring abuts against both the first operating sleeve and the second operating sleeve. Operating the first operating sleeve and the second operating sleeve sequentially can safely remove a plug.

3 Claims, 10 Drawing Sheets

(56) References Cited

U.S. PATENT DOCUMENTS

| | | | | |
|---|---|---|---|---|
| 5,390,963 A * | 2/1995 | Namekawa | ............. | F16L 37/23 |
| | | | | 285/316 |
| 5,445,358 A * | 8/1995 | Anderson | ................ | F16L 37/23 |
| | | | | 251/149.6 |
| 8,191,932 B2 * | 6/2012 | Davis | ...................... | F16L 37/23 |
| | | | | 137/614.05 |
| 8,256,803 B2 * | 9/2012 | Takahashi | ............... | F16L 37/34 |
| | | | | 285/276 |
| 8,641,013 B2 * | 2/2014 | Liu | ......................... | F16L 37/42 |
| | | | | 251/149.6 |
| 8,646,811 B1 * | 2/2014 | Chang | .................... | F16L 37/23 |
| | | | | 251/149.1 |
| 2012/0007357 A1 * | 1/2012 | Liu | ......................... | F16L 37/23 |
| | | | | 285/318 |

* cited by examiner

QUICK CONNECT FITTING

BACKGROUND OF THE INVENTION

1. Field of the Invention

The present invention relates to a coupling of quick-acting type, and more particularly to a quick connect fitting that has plural sleeves aligned to a common axis to control multiple balls mounted inside the plural sleeves and annularly disposed. The quick connect fitting can be securely fastened to another component by means of balls.

2. Description of Related Art

Figure 8:
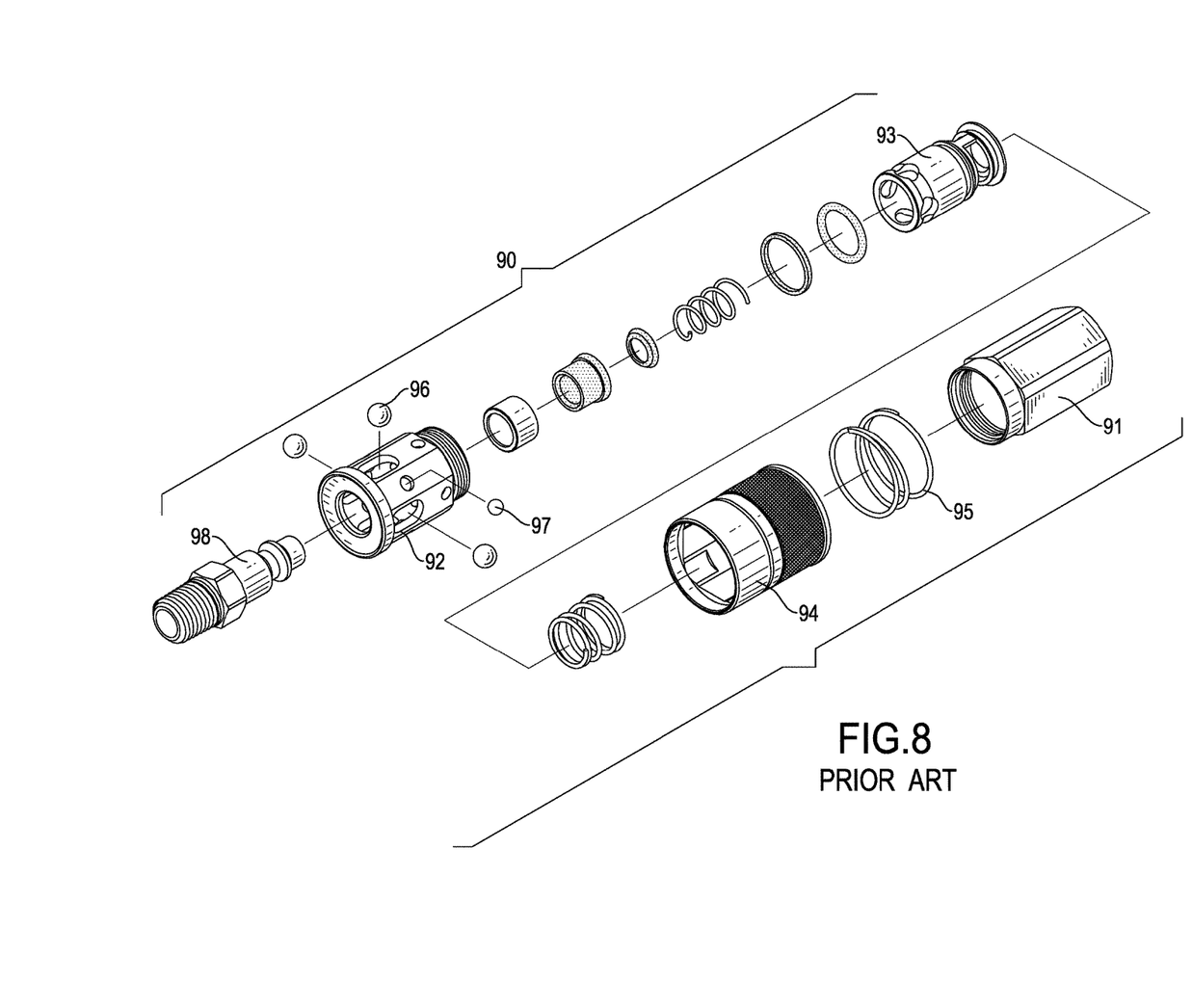
FIG. 8 is an exploded perspective view of a conventional quick connect fitting.
Figure 9:
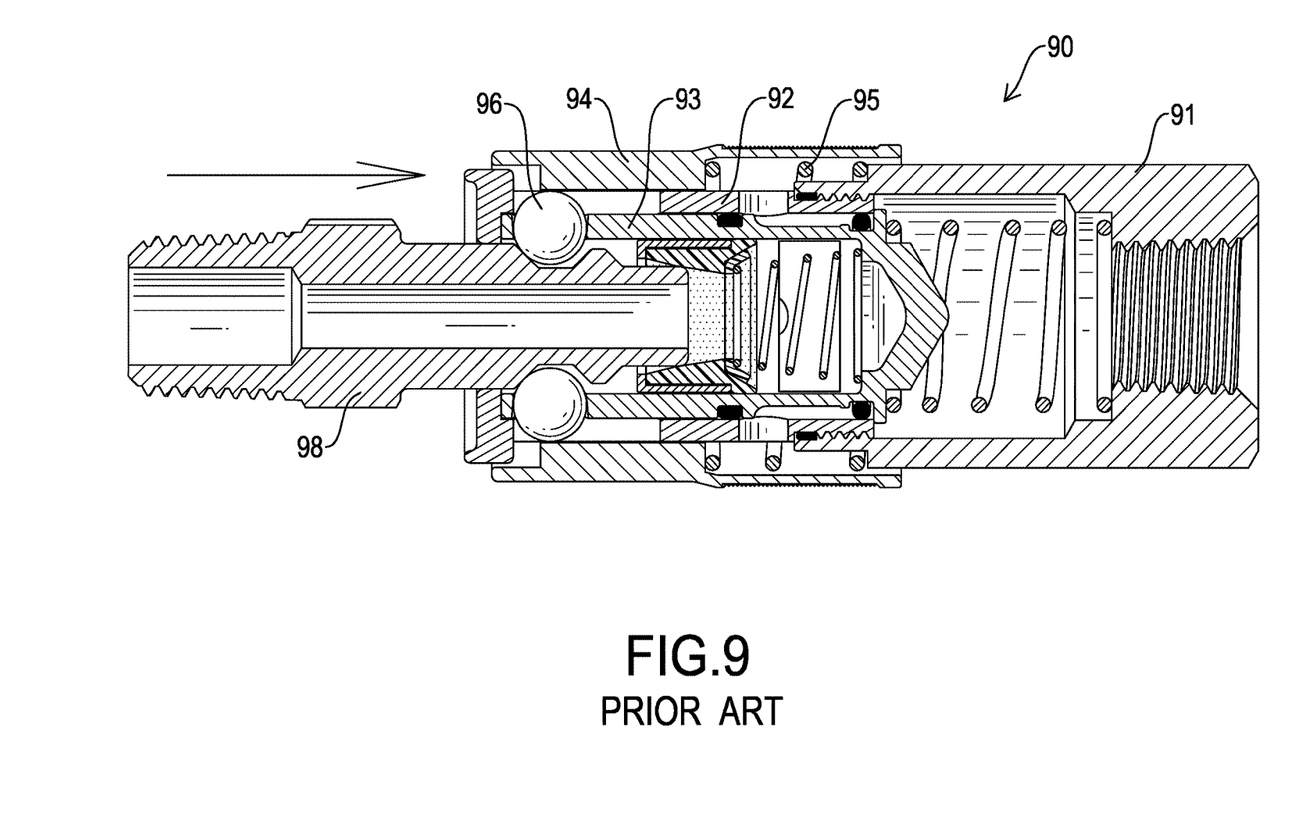
FIG. 9 is a side view in partial section of the conventional quick connect fitting showing a plug being inserted into the conventional quick connect fitting.
Figure 10:
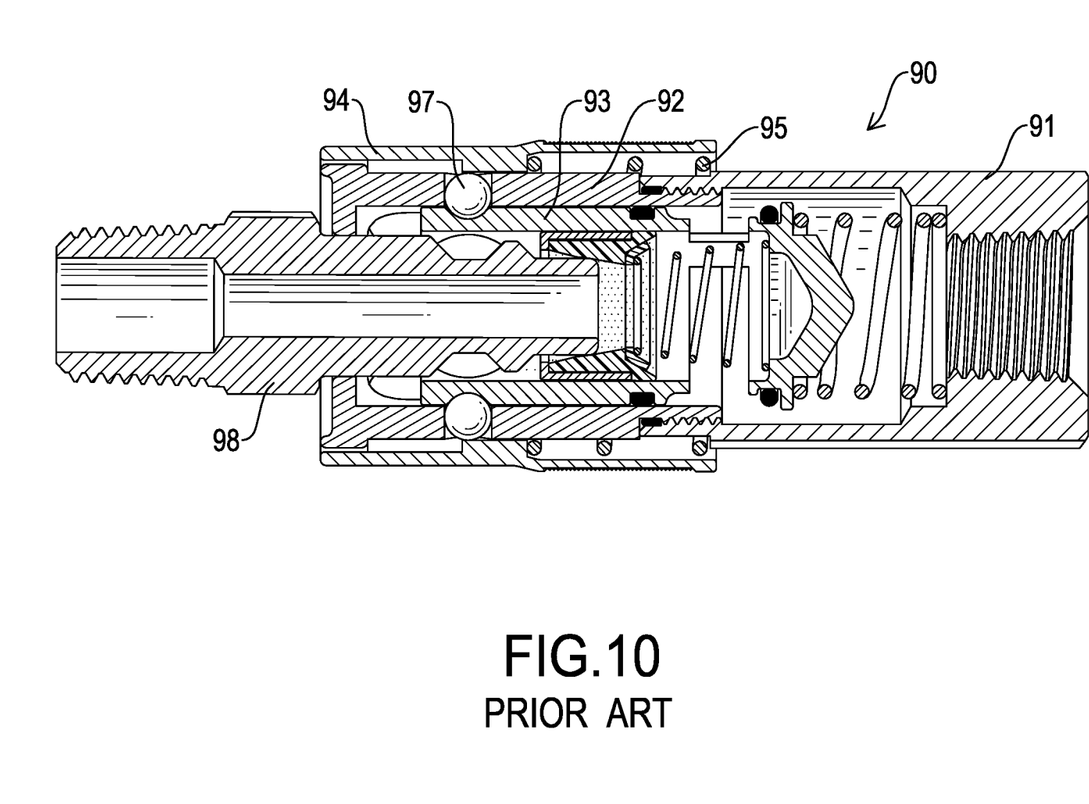
FIG. 10 is another side view in partial section of the conventional quick connect fitting showing a plug being inserted into the conventional quick connect fitting.

A quick connect fitting is used in plumbing of fluid transferring lines. The quick connect fitting can provide a fast connection or disconnection of lines. With reference to FIGS. 8, 9, and 10, a conventional quick connect fitting 90 has a body 91, a socket 92, a moving base 93, a sleeve 94, a spring 95, multiple first balls 96, and multiple second balls 97. The body 91 is tubular and has a front end and a rear end opposite the front end of the body 91. The socket 92 is tubular and is connected to the front end of the body 91. The moving base 93 is movably mounted inside the socket 92. The sleeve 94 is mounted around the socket 92. The spring 95 is mounted inside the sleeve 94 and is mounted around the socket 92. The spring 95 has two opposite ends. One of the two opposite ends of the spring 95 abuts against the body 91. The other end of the spring 95 abuts against the sleeve 94. The multiple first balls 96 and the multiple second balls 97 are mounted in the socket 92.

A plug 98 is inserted into the socket 92 and pushes the moving base 93 toward the rear end of the body 91. Pressured fluid is supplied from the rear end of the body 91 to the plug 98. The multiple first balls 96 are engaged with the plug 98 to prevent the plug 98 from being detached from the quick connect fitting 90, and the multiple first balls 96 are blocked by the sleeve 94, which is abutted against by the spring 95. The multiple second balls 97 are engaged with the moving base 93 to keep the moving base 93 in position, and the multiple second balls 97 are blocked by the sleeve 94 as well.

The sleeve 94 is moved toward the rear end of the body 91 to disconnect the plug 98 and the quick connect fitting 90. Since the sleeve 94 is detached from the multiple first balls 96 and the multiple second balls 97 at the same time, the pressured fluid can easily spurt out of the plug 98 from the quick connect fitting 90 and causes unexpected danger.

To overcome the shortcomings of the conventional quick connect fitting, the present invention provides a quick connect fitting to mitigate or obviate the aforementioned problems.

SUMMARY OF THE INVENTION

The main objective of the present invention is to provide a quick connect fitting that can prevent the pressured fluid from spurting out of a plug from the quick connect fitting.

The quick connect fitting comprises a coupling assembly, a socket assembled on the coupling assembly, multiple blocking balls, multiple locking balls, and an operating assembly. The multiple blocking balls and the multiple locking balls are mounted in the socket. The operating assembly has a first operating sleeve, a first compression spring, a second operating sleeve, and a second compression spring. The first operating sleeve is mounted around the socket and is blocked by the multiple locking balls. The first compression spring is mounted around the socket and abuts against both the first operating sleeve and the coupling assembly. The second operating sleeve is mounted around the socket and is blocked by the multiple blocking balls. The second compression spring is mounted around the socket and abuts against both the first operating sleeve and the second operating sleeve. Operating the first operating sleeve and the second operating sleeve sequentially can safely remove a plug.

Other objects, advantages, and novel features of the invention will become more apparent from the following detailed description when taken in conjunction with the accompanying drawings.

DETAILED DESCRIPTION OF PREFERRED EMBODIMENT

A quick connect fitting in accordance with the present invention utilizes plural sleeves that are aligned to a common axis to control multiple balls mounted inside the plural sleeves and annularly disposed.

Figure 1:
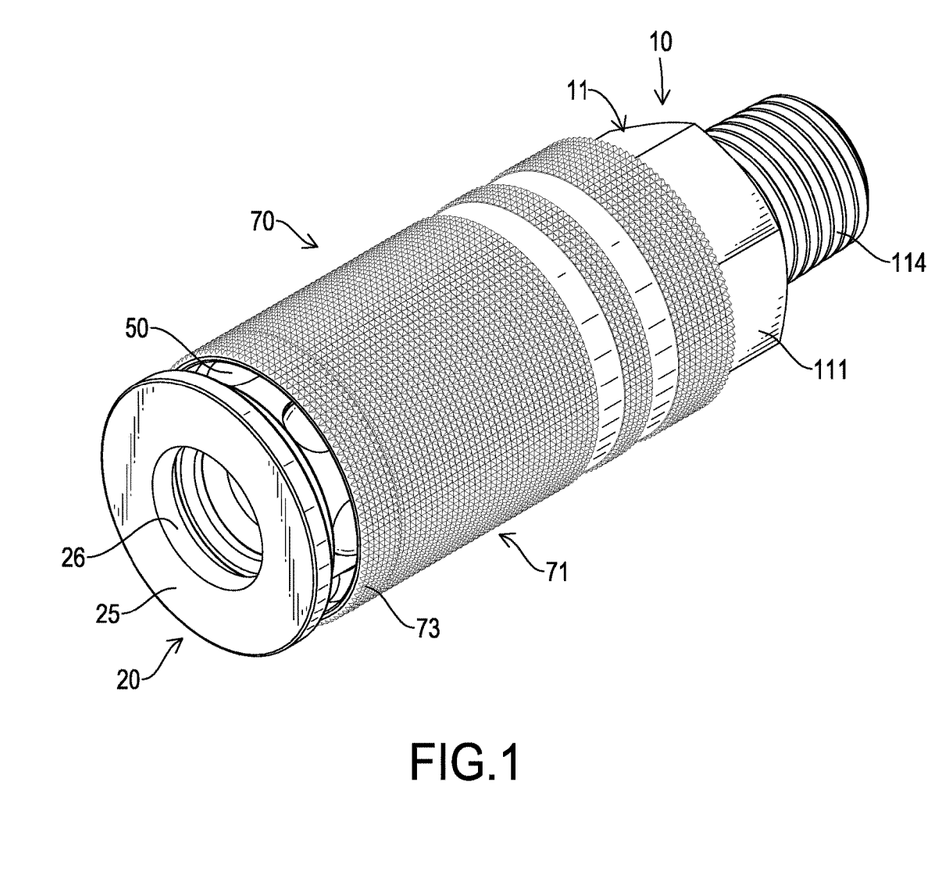
FIG. 1 is a perspective view of a quick connect fitting in accordance with the present invention.
Figure 2:
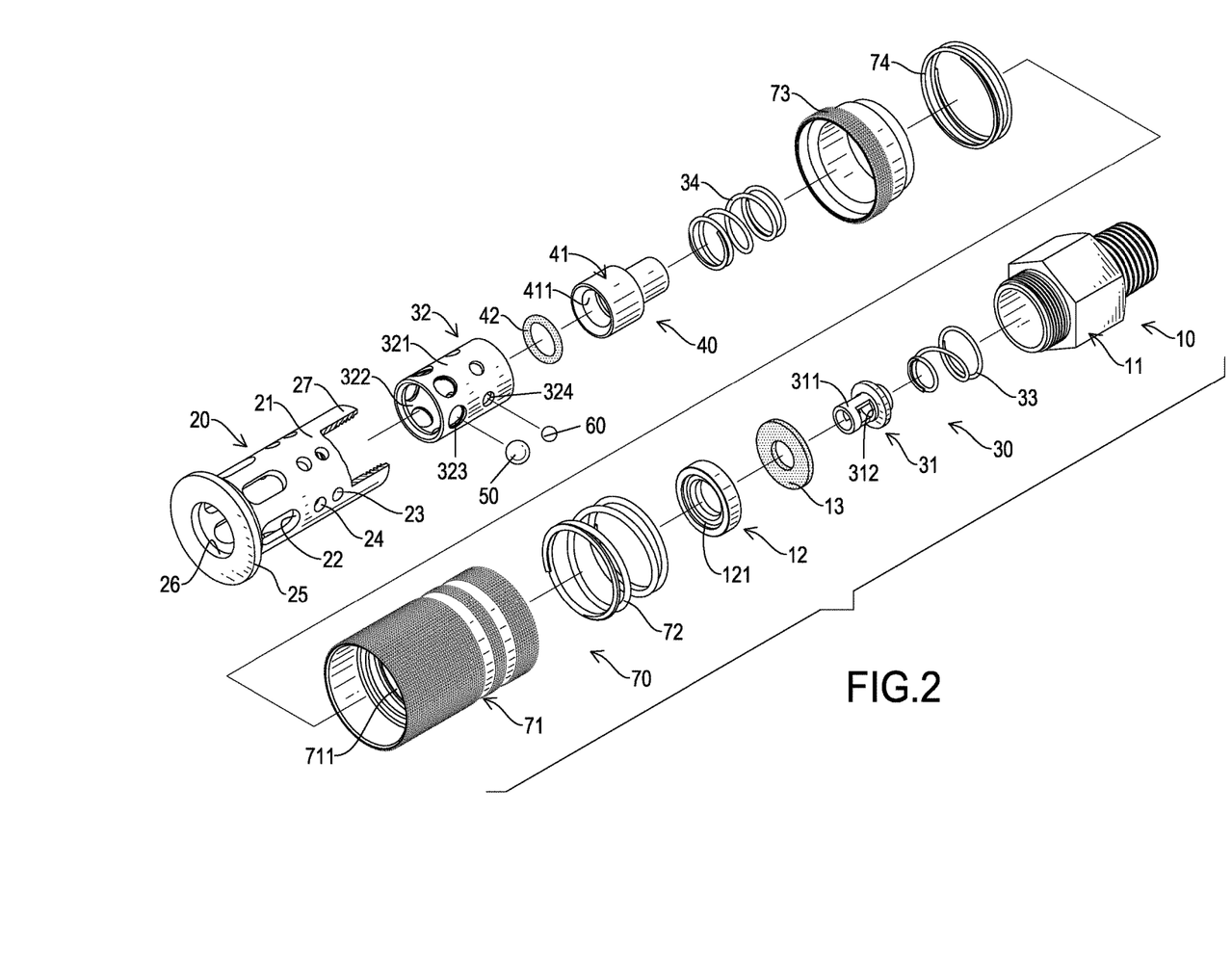
FIG. 2 is an exploded perspective view of the quick connect fitting in FIG. 1.
Figure 3:
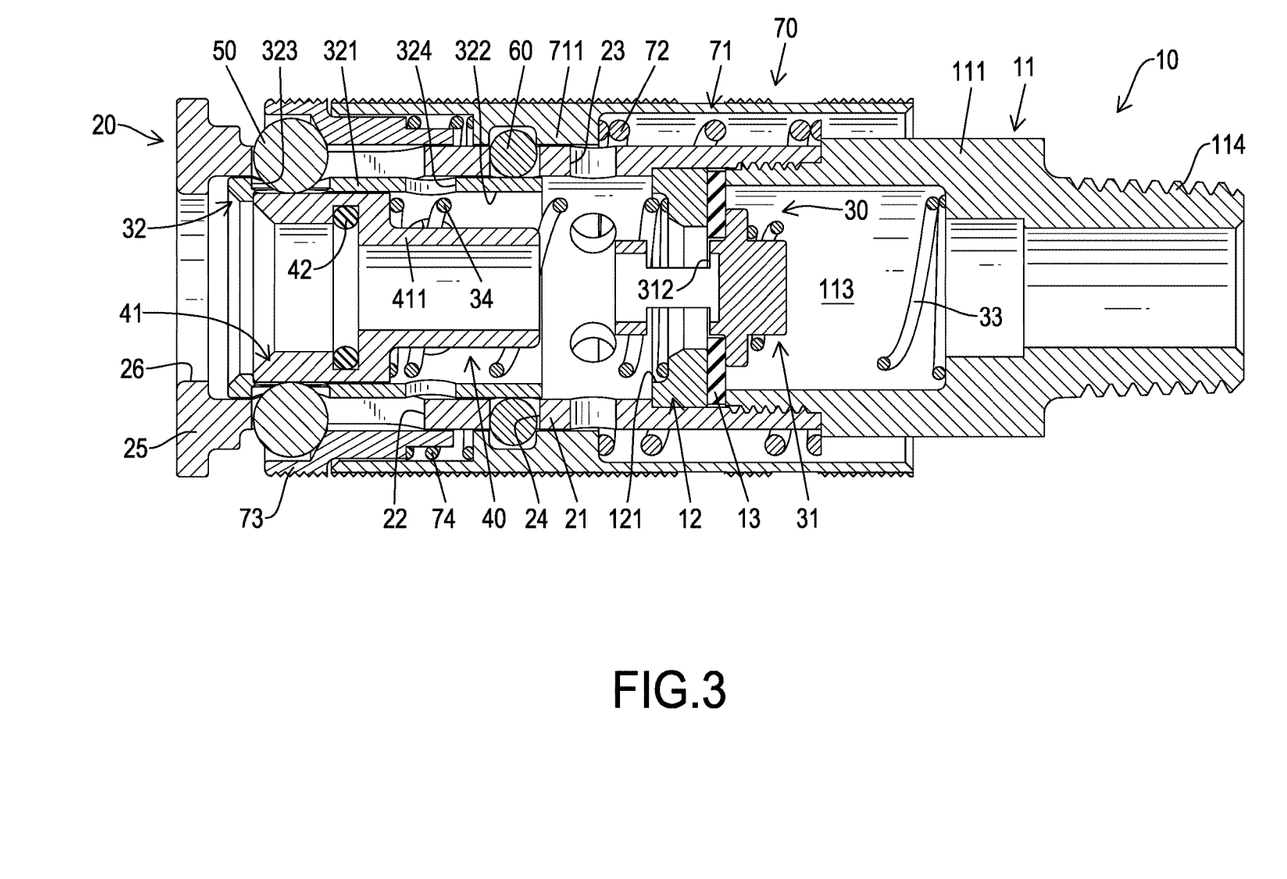
FIG. 3 is a cross-sectional side view of the quick connect fitting in FIG. 1.

With reference to FIGS. 1, 2, and 3, a quick connect fitting comprises a coupling assembly 10, a socket 20, a selection assembly 30, a blocking assembly 40, multiple blocking balls 50, multiple locking balls 60, and an operating assembly 70. The socket 20 is assembled on the coupling assembly 10. The selection assembly 30 and the blocking assembly 40 are mounted inside the socket 20. The multiple blocking balls 50 and the multiple locking balls 60 are mounted in the socket 20. The operating assembly 70 is assembled on the socket 20.

With reference to FIGS. 2 and 3, the coupling assembly 10 has a coupling unit 11, a spacer 12, and a seal 13. The coupling unit 11 has a main body 111, a containing hole 113, an external thread, and a coupling section 114. The main body 111 has a longitudinal direction, a first end, and a second end. The first end and the second end of the main body 111 are longitudinally opposite each other. The containing hole 113 is longitudinally defined in the main body 111, extends from the first end of the main body 111 toward the second end of the main body 111, and has a bottom.

With reference to FIGS. 2 and 3, the external thread is disposed at the first end of the main body 111. The coupling section 114 is connected to the second end of the main body 111. The coupling section 114 has an outer surface, a coupling thread, and an inlet. The coupling thread is formed on the outer surface of the coupling section 114. The inlet is defined in the coupling section 114 and coaxially communicates with the containing hole 113.

With reference to FIGS. 2 and 3, the spacer 12 is disposed in front of the coupling unit 11. The spacer 12 is annular and has a receiving recess 121. The receiving recess 121 and the first end of the main body 111 face to a same direction. The seal 13 is annular and is disposed between the main body 111 and the spacer 12. The seal 13 abuts against both the first end of the main body 111 and the spacer 12.

Figure 4:
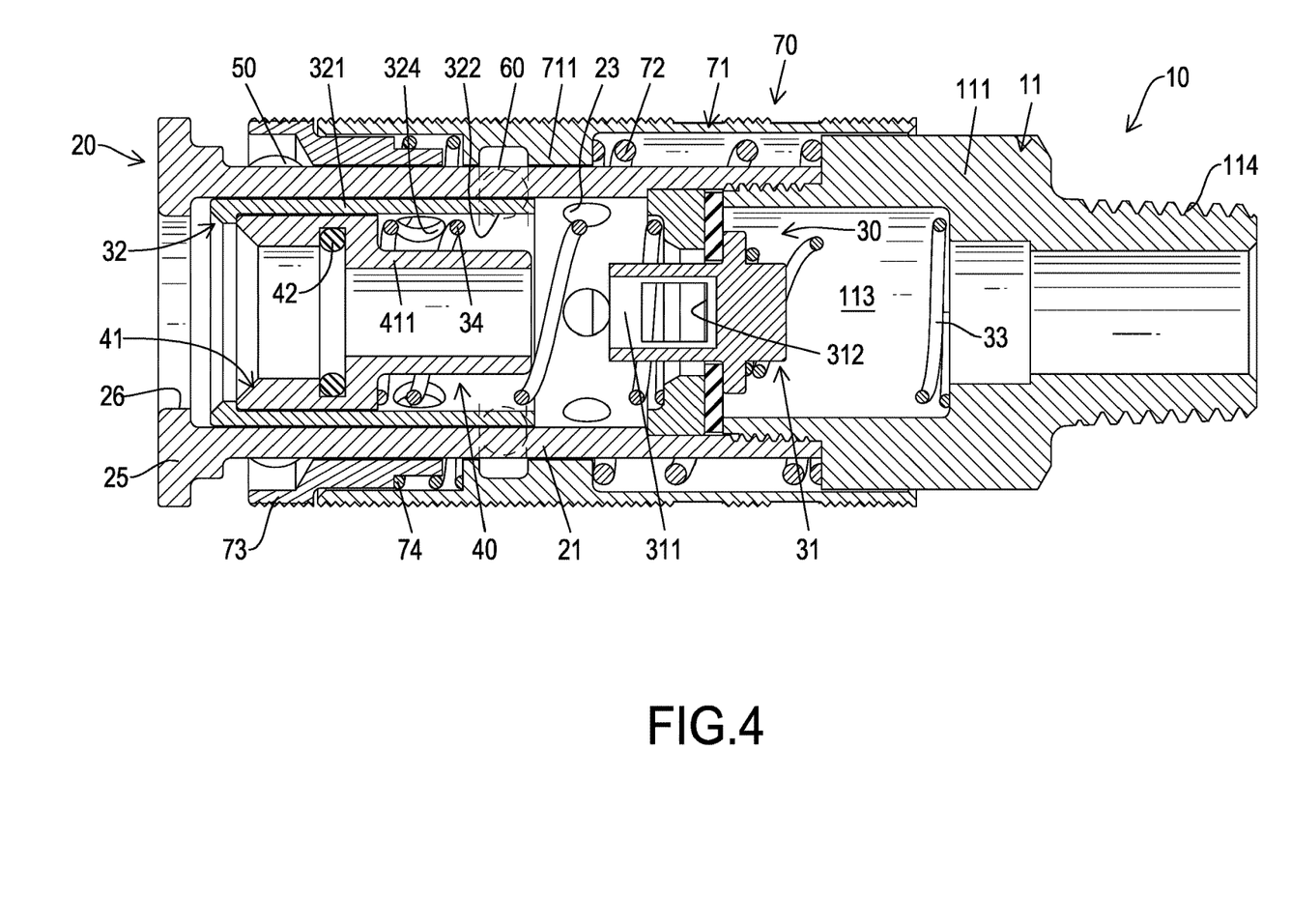
FIG. 4 is another cross-sectional side view of the quick connect fitting in FIG. 1.

With reference to FIGS. 2, 3 and 4, the socket 20 is connected to the coupling unit 11 and has a surrounding wall 21, a chamber, multiple elongated holes 22, multiple releasing holes 23, multiple retaining holes 24, a blocking rim 25, an inserting hole 26, and a connecting section 27. The surrounding wall 21 has a longitudinal direction, a first end, and a second end. The first end and the second end of the surrounding wall 21 are longitudinally opposite each other. The chamber of the socket 20 is formed inside the surrounding wall 21.

With reference to FIGS. 2, 3 and 4, the multiple elongated holes 22 are adjacent to the first end of the surrounding wall 21. The multiple elongated holes 22 are defined through the surrounding wall 21 and communicate with the chamber of the socket 20. The multiple elongated holes 22 are arranged at equiangular intervals. Each elongated hole 22 extends toward the second end of the surrounding wall 21. The multiple releasing holes 23 are adjacent to the second end of the surrounding wall 21. The multiple releasing holes 23 are defined through the surrounding wall 21 and communicate with the chamber. The multiple releasing holes 23 are arranged at equiangular intervals. The multiple retaining holes 24 are defined through the surrounding wall 21 and communicate with the chamber. The multiple retaining holes 24 are arranged at equiangular intervals. The multiple retaining holes 24 are disposed between the multiple elongated holes 22 and the multiple releasing holes 23.

With reference to FIGS. 2 and 3, the blocking rim 25 is connected to the first end of the surrounding wall 21. The inserting hole 26 is longitudinally defined through an end of the socket 20 distal from the coupling unit 11, and communicates with the chamber. The connecting section 27 is connected to the second end of the surrounding wall 21. The connecting section 27 is annular and has an outer surface and a thread formed on the outer surface of the connecting section 27. The connecting section 27 of the socket 20 is screwed in the connecting hole 112 of the coupling unit 11.

With reference to FIGS. 2 and 3, the selection assembly 30 is mounted inside the socket 20. The selection assembly 30 has a selection valve 31, a receiving unit 32, a restoring elastic unit 33, and an abutting elastic unit 34.

With reference to FIGS. 2 and 3, the selection valve 31 is movably mounted in the chamber of the socket 21. The selection valve 31 has a venting section 311 and two vents 312. The venting section 311 is cylindrical and has a surface. The two vents 312 are diametrically opposite each other. Each one of the two vents 312 is radially defined in the surface of the venting section 311 and communicates with an interior of the venting section 311.

The receiving unit 32 has a receiving section 321, a receiving hole 322, multiple first through holes 323, and multiple second through holes 324. The receiving section 321 is cylindrical and has a surface, a longitudinal direction, a first end facing to the inserting hole 26, and a second end longitudinally opposite the first end of the receiving section 321. The receiving hole 322 is longitudinally defined in the receiving section 321, extends from the first end of the receiving section 321 to the second end of the receiving section 321, and has an inner surface. The receiving hole 322 communicates with the two vents 312 of the selection valve 31.

With reference to FIGS. 2 and 3, the multiple first through holes 323 are adjacent to the first end of the receiving section 321, are arranged at equiangular intervals, and are respectively aligned with the multiple elongated holes 22. Each one of the multiple first through holes 323 is radially defined in the surface of the receiving section 321, communicates with the receiving hole 322, and has a diameter.

With reference to FIGS. 2 and 3, the multiple second through holes 324 are arranged at equiangular intervals and are respectively aligned with the multiple elongated holes 22. The multiple second through holes 324 are disposed between the multiple first through holes 323 and the second end of the receiving section 321. Each one of the multiple second through holes 324 is radially defined in the surface of the receiving section 321, communicates with the receiving hole 322, and has a diameter.

With reference to FIGS. 2 and 3, one of the two opposite ends of the restoring elastic unit 33 abuts against the bottom of the containing hole 113. The other end of the restoring elastic unit 33 abuts against the selection valve 31. The abutting elastic unit 34 is mounted in the receiving hole 322 of the receiving unit 32. The abutting elastic unit 34 is a compression spring and has two opposite ends. One of the two opposite ends of the abutting elastic unit 34 abuts against the receiving recess 121 of the spacer 12.

With reference to FIGS. 2, 3, and 4, the blocking assembly 40 is mounted inside the receiving unit 32 and has a blocking component 41 and an O-ring 42 mounted inside the blocking component 41. The blocking component 41 is mounted in the receiving hole 322 of the receiving unit 32. The blocking component 41 blocks the multiple elongated holes 22 and abuts against the abutting elastic unit 34. The blocking component 41 has a channel 411 communicating with the chamber of the socket 20.

With reference to FIGS. 2 and 3, the multiple blocking balls 50 are respectively contained in the multiple elongated holes 22 of the socket 20. The multiple blocking balls 50 are abutted by the blocking component 41 of the blocking assembly 40. Each one of the multiple blocking balls 50 has a diameter corresponding to the diameter of each one of the multiple first through holes 323.

With reference to FIGS. 2, 3 and 4, the multiple locking balls 60 are respectively contained in the multiple retaining holes 24 of the socket 20 and are abutted by the surface of the receiving section 321 of the receiving unit 31. Each one of the multiple locking balls 60 has a diameter corresponding to the diameter of each one of the multiple second through holes 324. The diameter of the locking ball 60 is smaller than the diameter of the blocking ball 50.

With reference to FIGS. 2 and 3, the operating assembly 70 is assembled on the socket 20 and has a first operating sleeve 71, a first compression spring 72, a second operating sleeve 73, and a second compression spring 74. The first operating sleeve 71 is mounted around the socket 20. The first operating sleeve 71 has an inner surface and an annular abutting portion 711. The annular abutting portion 711 is formed on the inner surface of the first operating sleeve 71, is arranged at a middle position on the first operating sleeve 71, and is blocked by the multiple locking balls 60. The first compression spring 72 is mounted around the socket 20. The first compression spring 72 has two opposite ends. The first compression spring 72 is in a stretched status, and one of the two opposite ends of the first compression spring 72 abuts against the coupling unit 11 of the coupling assembly 10. The other end of the first compression spring 72 abuts against the annular abutting portion 711 of the first operating sleeve 71. The second operating sleeve 73 is mounted around the socket 20 and is blocked by the multiple blocking balls 50. The second operating sleeve 73 has an inner surface. The second compression spring 74 is mounted around the socket 20. The second compression spring 74 has two opposite ends. One of the two opposite ends of the second compression spring 74 abuts against the annular abutting portion 711 of the first operating sleeve 71. The other end of the second compression spring 74 abuts against the second operating sleeve 73. Since the second operating sleeve 73 is blocked by the multiple blocking balls 50, the second compression spring 74 is in a compressed status. Thereby, the second operating sleeve 73 is separated from the blocking rim 25 of the socket 20.

With reference to FIGS. 3 and 4, the multiple blocking balls 50 are blocked by the blocking component 41 of the blocking assembly 40, and the multiple locking balls 60 are abutted by the receiving unit 32 of the selection assembly 30.

Figure 5:
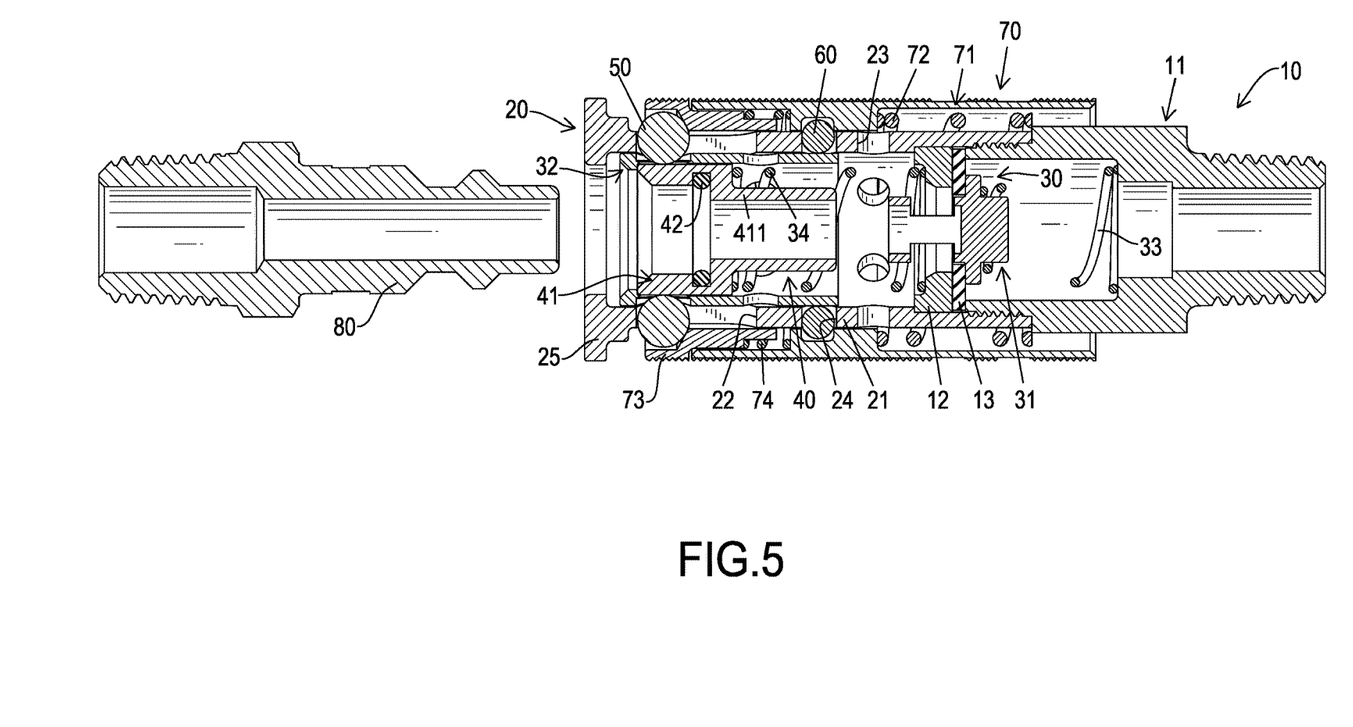
FIG. 5 is an operational cross-sectional side view of the quick connect fitting in FIG. 1 showing a plug being inserted into the quick connect fitting and the vent being sealed.
Figure 6:
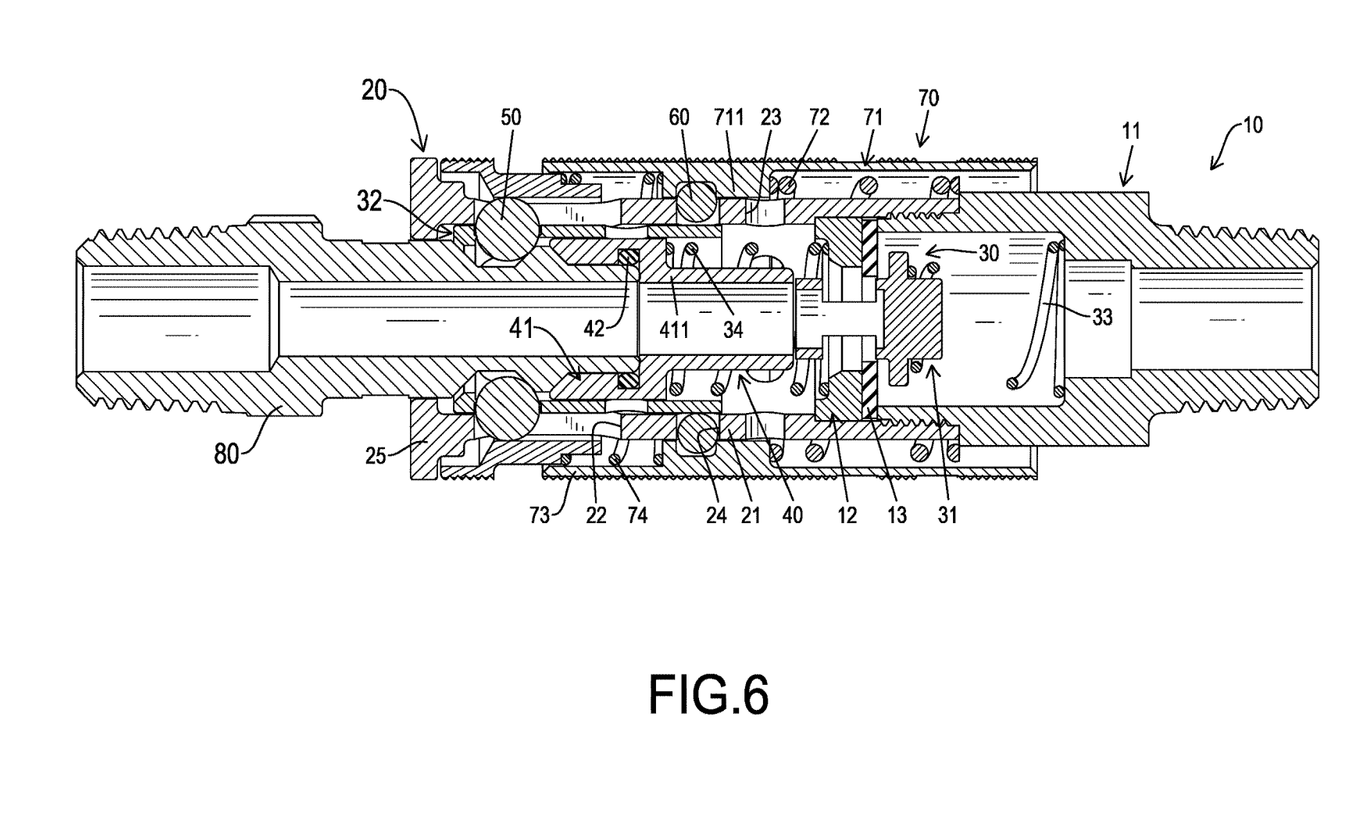
FIG. 6 is another operational cross-sectional side view of the connect fitting in FIG. 1 showing a plug being inserted into the quick connect fitting and the vent being sealed.

With reference to FIGS. 5 and 6, a plug 80 is inserted into the inserting hole 26 of the socket 20 and then into the receiving hole 322 of the receiving unit 32. The plug 80 abuts the blocking component 41 and pushes the blocking assembly 40 toward the coupling unit 11 of the coupling assembly 10 to compress the abutting elastic unit 34. When the blocking component 42 moves toward the coupling unit 11 and is detached from the multiple blocking balls 50, the blocking component 41 unblocks the multiple elongated holes 22. The multiple blocking balls 50 respectively drop from the multiple elongated holes 22, respectively pass through the multiple first through holes 323, and are engaged with the plug 80. Without blocking by the multiple blocking balls 50, the second operating sleeve 73 is pushed by the second compression spring 74 and abuts against the blocking rim 25 of the socket 20. The inner surface of the second operating sleeve 73 abuts against the multiple blocking balls 50. The multiple blocking balls 50 engaged with the plug 80 and abutted by the second operating sleeve 73 can prevent the plug 80 from being detached from the socket 20.

Figure 7:
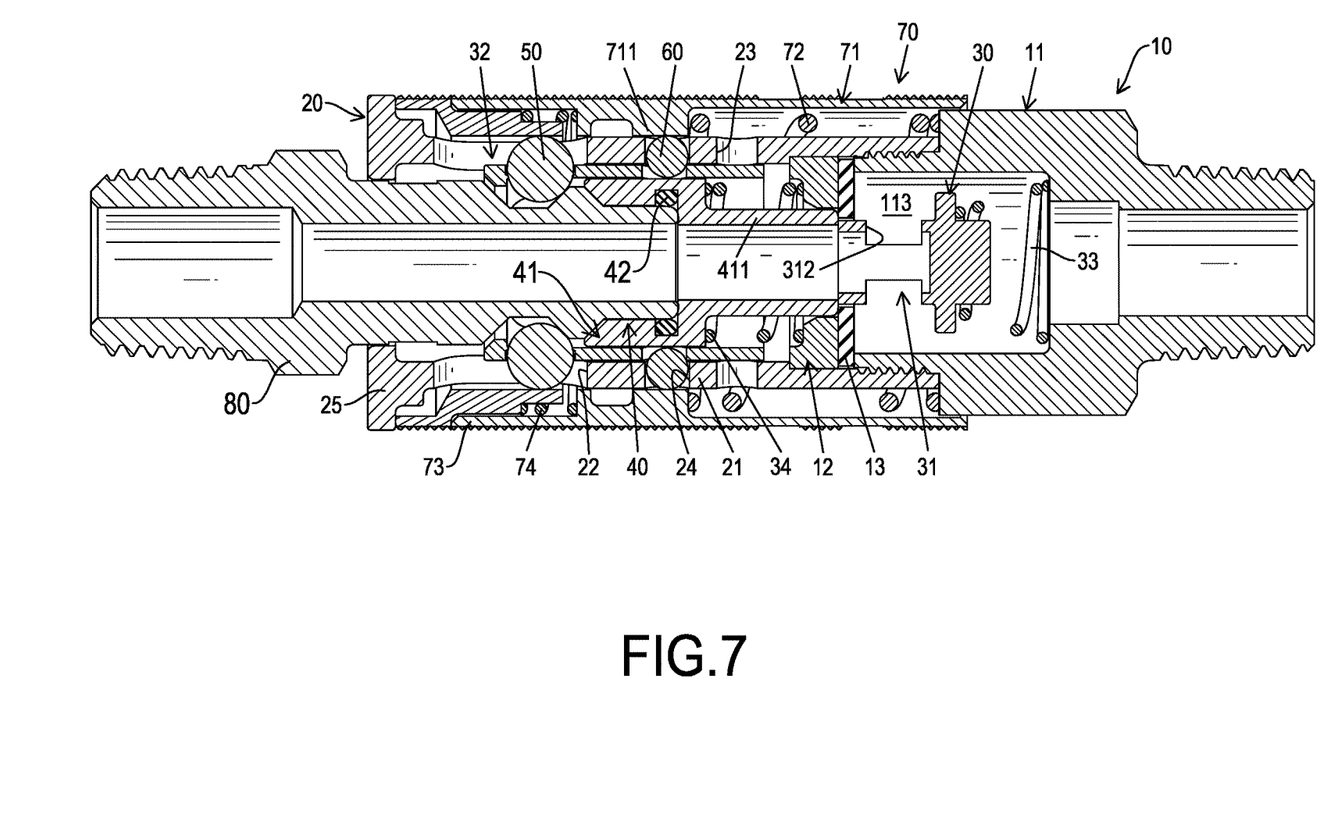
FIG. 7 is another operational cross-sectional side view of the quick connect fitting in FIG. 1 showing a plug being inserted into the quick connect fitting and the vent being opened.

With reference to FIGS. 7 and 8, as the plug 80 is being inserted into the receiving hole 313 continually, the receiving unit 32 is pushed toward the coupling unit 11, and the multiple locking balls 60 respectively drop into the multiple second through holes 324 of the receiving unit 32 and are engaged with the receiving unit 32. The multiple locking balls 60 engaged with the receiving unit 32 and abutted by the annular abutting portion 711 of the first operating sleeve 71 can keep the receiving unit 32 in a fixed position. The venting section 311 of the selection valve 31 passes through the spacer 12 and the seal 13, and the selection valve 32 compresses the restoring elastic unit 33 of the selection assembly 30. The two vents 312 communicate with the containing hole 113 of the coupling unit 11. The fluid introduced from the inlet of the coupling section 114 flows into the containing hole 113, passes through the two vents 312 and into the channel 411 of the blocking component 41 of the blocking assembly 40, and eventually flows into the plug 80.

As the first operating sleeve 71 of the operating assembly 70 is being pulled toward the coupling unit 11 of the coupling assembly 10, the annular abutting portion 711 of the first operating sleeve 71 is detached from the multiple locking balls 60. Without being abutted by the first operating sleeve 71, the selection valve 31 is pushed away from the coupling unit 11 by the restoring elastic unit 33. The blocking component 41 is pushed toward the blocking rim 25 of the socket 20 by the selection valve 31. The plug 80 and the multiple blocking balls 50 engaged with the plug 80 are pushed away from the coupling unit 11 simultaneously by the blocking component 41. The receiving unit 32 and the multiple locking balls 60 engaged with the receiving unit 32 are pushed toward the blocking rim 25 simultaneously by the multiple blocking balls 50 engaged with the receiving unit 32. Thereby the two vents 312 are moved out of the containing hole 113. Accordingly, the channel 411 and the containing hole 113 are kept from communicating with each other.

And then, the second operating sleeve 73 is pulled toward the coupling unit 11. The inner surface of the second operating sleeve 73 is detached from the multiple blocking balls 50. Without being abutted by the second operating sleeve 73, the multiple blocking balls 50 can be easily pushed by the plug 80 and are disengaged from the plug 80. The blocking component 41 is pushed by the abutting elastic unit 34 and moves toward the blocking rim 25. The blocking component 41 abuts against the plug 80 and makes the plug 80 even more easily detached from the socket 20. Since the channel 411 and the containing hole 113 are kept from communicating with each other, the plug 80 can be safely removed without the concerns of fluid spurting out from the socket 20.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A quick connect fitting comprising:
  a coupling assembly having
    a coupling unit having
      a main body having
        a longitudinal direction;
        a first end; and
        a second end being longitudinally opposite the first end of the main body;
        a containing hole longitudinally defined inside the main body and having a bottom;
      a seal being annular and abutting against the first end of the main body;
    a socket connected to the coupling unit and having
      a surrounding wall having
        a longitudinal direction;
        a first end;
        a second end being longitudinally opposite the first end of the surrounding wall; and
        a peripheral surface;
      a chamber formed inside the surrounding wall;

multiple elongated holes being adjacent to the first end of the surrounding wall, arranged at equiangular intervals, defined through the surrounding wall, and communicating with the chamber, and each of the multiple elongated holes extending toward the second end of the surrounding wall;

multiple retaining holes disposed between the second end of the surrounding wall and the multiple elongated holes, arranged at equiangular intervals, defined through the surrounding wall, and communicating with the chamber; and an inserting hole longitudinally defined through an end of the socket distal from the coupling unit and communicating with the chamber;

a selection assembly mounted inside the socket and having
   a selection valve movably mounted in the chamber and having at least one vent;
   a receiving unit having
      a receiving section having
         a surface;
         a longitudinal direction;
         a first end facing to the inserting hole; and
         a second end longitudinally opposite the first end of the receiving section;
      a receiving hole longitudinally defined in the receiving section and communicating with the at least one vent;
      multiple first through holes being adjacent to the first end of the receiving section, arranged at equiangular intervals, and respectively aligned with the multiple elongated holes, and each one of the multiple first through holes defined in the surface of the receiving section and communicating with the receiving hole;
      multiple second through holes arranged at equiangular intervals, and respectively aligned with the multiple elongated holes, and each one of the multiple second through holes defined in the surface of the receiving section and communicating with the receiving hole;
   a restoring elastic unit elongating along the longitudinal direction of the main body, mounted in the containing hole and having
      two opposite ends disposed in the longitudinal direction of the main body;
         one of the two opposite ends of the restoring elastic unit abutting against the bottom of the containing hole; and
         the other end of the restoring elastic unit abutting against the selection valve; and
   an abutting elastic unit elongating along the longitudinal direction of the surrounding wall and having
      two opposite ends disposed in the longitudinal direction of the surrounding wall;
         one of the two opposite ends of the abutting elastic unit abutting against a spacer;
a blocking component mounted inside the receiving unit, elongating along the longitudinal direction of the receiving section, and abutted by the end of the abutting elastic unit that is opposite the bottom of the containing hole;

multiple blocking balls respectively contained in the multiple elongated holes and abutted by the blocking component;

multiple locking balls respectively contained in the multiple retaining holes and abutted by the surface of the receiving section of the receiving unit;

an operating assembly assembled on the socket and having
   a first operating sleeve mounted around the socket and blocked by the multiple locking balls;
   a first compression spring mounted on the socket, mounted around the socket, and having
      two opposite ends;
         one of the two opposite ends of the first compression spring abutting against the coupling unit socket; and
         the other end of the first compression spring abutting against the first operating sleeve;
   a second operating sleeve mounted around the socket and blocked by the multiple blocking balls; and
   a second compression spring being in a compressed status, encircling the socket, and having
      two opposite ends;
         one of the two opposite ends of the second compression spring abutting against the first operating sleeve;
         the other end of the second compression spring abutting against the second operating sleeve.

2. The quick connect fitting as claimed in claim 1, wherein the spacer is mounted inside the coupling unit, is annular, and has a receiving recess; and
the receiving recess and the first end of the main body face to a same direction.

3. The quick connect fitting as claimed in claim 2, wherein the restoring elastic unit is a conical compression spring.

* * * * *